United States Patent [19]

Zuerndorfer et al.

[11] 4,163,231

[45] Jul. 31, 1979

[54] RADAR MAPPING TECHNIQUE

[75] Inventors: Henry D. Zuerndorfer, Lexington, Mass.; Hans A. Maurer, Tarzana, Calif.; Donald S. Banks, Wellesley, Mass.

[73] Assignee: Raytheon Company, Lexington, Mass.

[21] Appl. No.: 695,432

[22] Filed: Jan. 3, 1968

[51] Int. Cl.$^2$ .............................................. G01S 9/02
[52] U.S. Cl. ........................... 343/5 CM; 343/5 MM; 343/7 ED
[58] Field of Search ............ 343/5 CM, 5 MM, 7 ED

[56] References Cited

U.S. PATENT DOCUMENTS

| 3,624,650 | 11/1971 | Paine ............................. 343/5 CM X |
| 3,662,384 | 5/1972 | Albert ........................... 343/5 CM X |
| 3,856,237 | 12/1974 | Torian et al. ................ 343/5 MM X |

Primary Examiner—T. H. Tubbesing
Attorney, Agent, or Firm—Philip J. McFarland; Joseph D. Pannone

[57] ABSTRACT

A radar mapping technique employing a synthetic aperture radar in conjunction with a correlator for directing an object moving in mid air to a desired point on the ground, which point is determined by correlating direct and indirect return signals from the ground and through the moving object respectively.

14 Claims, 4 Drawing Figures

RADAR MAPPING TECHNIQUE

BACKGROUND OF THE INVENTION

This invention relates to a radar mapping technique employing a synthetic aperture radar which permits continuous mapping of points on the ground towards which an object moving in mid air is traveling in a rotating frame of reference or curvilinear path. Coherent side-looking imaging radars have been used to produce radar maps with photographic quality. High-resolution maps in two dimensions have been produced by an airborne radar through the generation of a synthetic aperture in the azimuth direction and pulse compression in the range direction. In the general operation of a side-looking radar, an airborne vehicle travels parallel to the ground with a given velocity. On board the vehicle is a pulse-doppler radar system whose physical aperture having a pre-determined beamwidth illuminates a ground-swath parallel to the flight path. The radar beam points in a direction which is orthogonal to the vehicle's flight path. The synthetic aperture radar system includes a transmitter from which range information is obtained by pulsing the transmitter. Fine range resolution and fine azimuth resolution are derived by storing the returned pulses over the time a ground scatterer stays within the physical aperture beamwidth, and then the stored data is processed in a correlator. Each pulse is linearly frequency modulated within each pulse by the transmitter, and the sequence of pulses, gathered over a beam dwell time, are doppler frequency modulated due to the airborne vehicle's path across the ground scatterer. The finely resolved images are displayed on a two dimensional display to form a radar map of the ground. On this display, the range coordinate is in the "cross-track" direction and azimuth is in the "along-track" direction. Thus, a physical aperture, whose dimensions are comensurate with the size of a spacecraft, in combination with a coherent radar and data processor can synthesize a very long antenna which is required to achieve a narrow beam in the azimuth dimension.

However, all such side-looking synthetic aperture radar systems have operated on the concept that all points located on the ground are in focus because the airborne vehicle is traveling in a path parallel to the ground instead of directly toward it. The radar mapping technique of the present invention utilizes a synthetic aperture radar to achieve continuous mapping of points on the ground towards which an object moving in mid air is traveling in a rotating frame of reference or curvilinear path. The technique of the present invention recognizes that the distortion phenomenon which results from traveling toward a desired point may be used for mapping the desired point for the purpose of directing a moving object toward that point.

SUMMARY OF THE INVENTION

The above features and advantages of the present invention as well as others are achieved by providing a mapping system for mapping points on the ground towards which an object may be traveling, said system comprising means for transmitting a beam so as to illuminate a portion of the ground, means for receiving return signals from the illuminated portion of the ground, means for correlating the return signals, means for displaying the correlated signals and for indicating the location of a predetermined point on the ground, focus detection means connected to the output of the correlation means for indicating the location of the point on the ground towards which the object is actually traveling; and means connected to the output of the display means and the focus detection means for comparing the signal outputs and for maintaining the predetermined point on the ground in the area of best focus.

DESCRIPTION OF THE PREFERRED EMBODIMENTS

Figure 1:
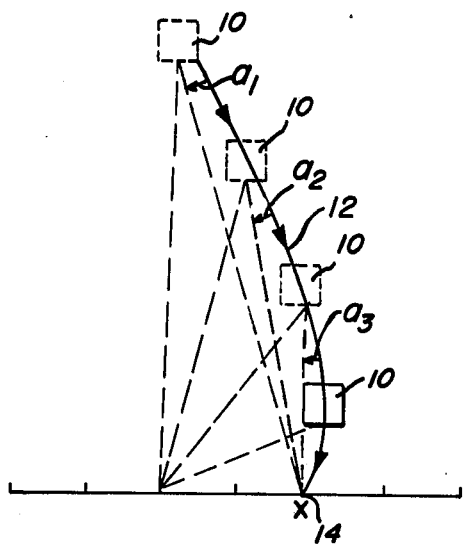
FIG. 1 illustrates one type of application of the present invention.
Figure 2:
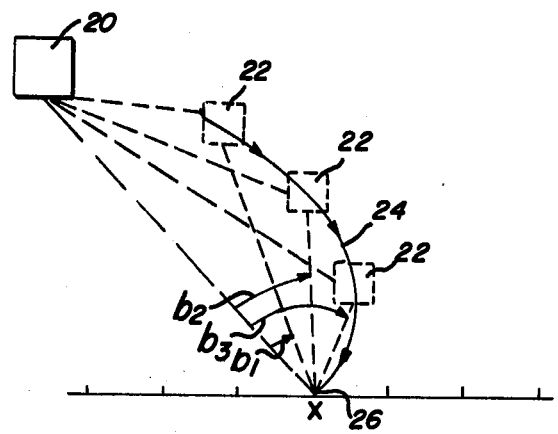
FIG. 2 illustrates a second application of the present invention.
Figure 3:
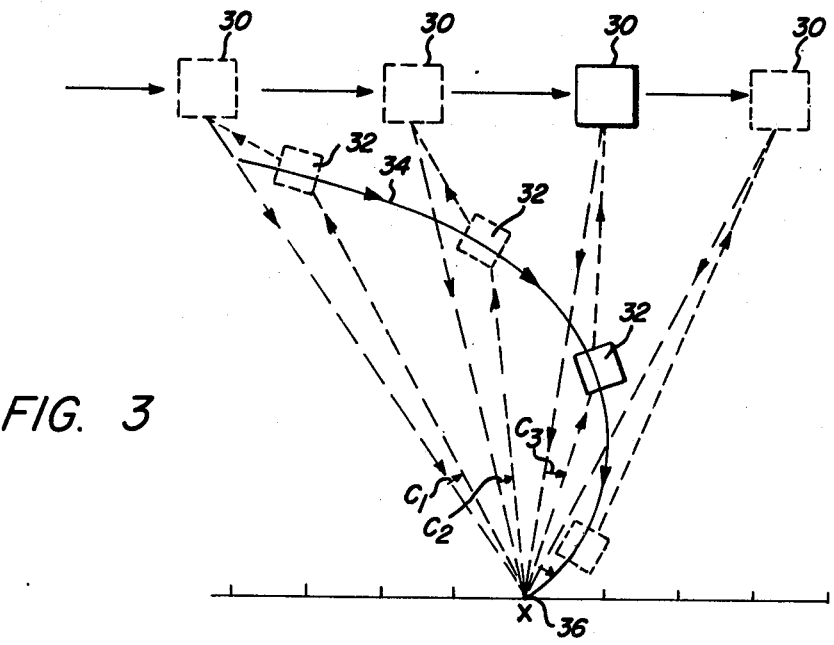
FIG. 3 represents a third application of the present invention.

The radar mapping technique of the present invention may be utilized in a number of applications, three of which are illustrated in FIGS. 1-3. Of course, the concept of the present invention may be employed in numerous other types of applications. FIGS. 1-3 each show a separate application of the radar mapping technique of the present invention as used to direct an object moving in mid air in a curvilinear path to a desired point on the ground.

FIG. 1 shows the employment of the present invention wherein the moving object 10 is traveling in a curvilinear path 12 towards the desired point on the ground 14. In this particular application, the moving object itself contains the synthetic aperture radar and the other necessary equipment for processing the signals in order to direct the object towards point 14 on the ground. The angles $a_1$, $a_2$ and $a_3$ are the control parameters which are designed to continuously keep the object 10 traveling towards point 14.

FIG. 2 shows a system in which the synthetic aperture radar system is in a fixed position represented by the block 20. The moving object 22 moves in a curvilinear path 24 towards the desired point on the ground 26. The radar system 20 transmits and receives signals as will later be described in such manner that the object is directed towards the point 26. The angles $b_1$, $b_2$ and $b_3$ are the control parameters which are designed to continuously keep the object 22 traveling towards point 26.

In the embodiment shown in FIG. 3, the radar system 30 moves in a direction parallel to the ground. The moving object 32 travels in a curvilinear path 34 towards the desired point on the ground 36. The signals transmitted and received by the radar 30 are used in such a manner to direct the moving object 32 on the curvilinear path 34 towards the point 36. The angles $c_1$, $c_2$ and $c_3$ are the control parameters which are designed to continuously keep the object 32 traveling towards the point 36.

The principle of operation and equipment which permit the operation of each of the applications as shown in FIGS. 1-3 will now be described. The radar mapping technique of the present invention permits high accuracy, all weather, air-to-ground guidance of an object moving in mid air in a curvilinear path towards a desired point on the ground. The technique is based on deriving signals by processing the characteristic distortions of a synthetic aperture radar map which are associated with the retransmission of ground returns through an object moving towards the ground. These distortions are related to the desired point towards which the moving object is directed. The radar mapping technique of the present invention utilizes a concept known as synthetic aperture retransmission guidance. The guidance of the moving object is accomplished by measuring the location of the point on the ground to which the target is directed assuming the curvilinear path remains unchanged with respect to the location of the point on the ground to which it is desired to direct the moving object. These measurements are made several times in the course of directing the object to the desired point on the ground and increase in accuracy with decreasing range to the desired point. Computation of updating commands proportional to the displacement between the predetermined point on the ground and the desired point on the ground and subsequent commands to the moving object makes the final point and the desired point coincide precisely.

The ability to obtain precise location data with respect to the desired point on the ground is based on the main postulate of the synthetic aperture retransmission guidance concept. This postulate states that synthetic aperture radar ground echoes, when retransmitted through a suitable relay and processed by the matched filter array of the radar will produce a ground map whose best focused point precisely and unambiguously coincides with the point on the ground towards which the object is heading. Since in the employment shown in FIGS. 2 and 3 no processing in the moving object is required but only retransmission of signals, the introduction of a moving relay point in the form of the moving object into the conventional signal path of a synthetic aperture radar changes it from a straight line signal path to a triangle of the varying shape. These triangles are illustrated in FIGS. 1-3. This trianguler signal path shape obviously maintains the total pulse path and relates the phase history of the return signals to the triangular path length and its derivatives in a unique manner. These effects on the phase history of the return signals are the cause of map distortion which are used to identify the ground point towards which the object is traveling. If the moving object remains on the line of sight connecting the radar to the desired ground point, then the path length to that point is unaltered by the moving object's presence. Therefore, no phase changes would occur, and the point on the ground towards which the object would be moving would appear in the indirect map exactly as it would appear in a conventional synthetic aperture map generated from the direct path signals. All other points would be distorted to a varying degree, thus high-lighting the location of the desired point on the total map. These time-varying path alternatives result in three distinct map distortion effects:

(1) A constant difference in path length ($K_o$) results in a range shift.
(2) A linearly time-varying path length change ($K_1$) causes a doppler shift and results in a change in azimuth (similar to the effects associated with mapping a moving object.).
(3) The second derivative of path length change ($K_2$) corresponds to a doppler slope (rate) change and will result in a mismatch or defocussing. (A point will "smear" over a series of azimuth resolution cells or filters.)

In terms of map appearances $K_0$ and $K_1$ effects tend to stretch a map while the $K_2$ effects result in a loss of contrast in the azimuth direction, quite similar to the blur observed in photography when objects move more than one resolution cell during exposure time in one direction. The degree to which these effects can be exploited depends on the detection methods used. Thus, if the level of azimuth smear varies over the scene, the area of minimum $K_2$ (best focus) can be determined without recourse to a standard.

An investigation of the relationship of the change coefficients ($K_0$, $K_1$, $K_2$) to the radar-moving object-ground point geometry relationship shows that the point of minimum $K_2$ is unambiguously the desired point on the ground. For all moving object curvilinear paths, the point at which the object will reach the ground can be identified as the point of best focus. Furthermore, the resolution of the area of best focus is approximately that of a direct picture for paths having shallow dive angles or can be constrained to this property for certain paths at large dive angles. These fundamental relationships result in the mapping techniques employed in the synthetic aperture retransmission guidance concept:

(1) Identification and acquisition of the desired ground point is performed in the area of best focus of the indirect map.
(2) The object will reach the desired point on the ground by directing the object's velocity vector so that the desired ground point appears and remains within the area of best focus.

Thus, the aiming spot towards the desired point on the ground will not interfere with acquisition but collapses as an inverse function of range to the third power until it is a virtual pinhole at a point near the end of the curvilinear path.

Since in the synthetic aperture retransmission guidance concept it is readily discernible that the path of an indirect pulse reflected from the line of sight ground intercept is identical with the path of a direct pulse from the same point, neither the position nor the speed of the moving object along the line of sight has any effect on the phase history of the radar returns from this point. This point appears on the indirect map identically as it would on a direct or conventional synthetic aperture map. The path lengths traversed by returns from all other ground points are altered when viewed in the indirect manner. A closer examination of the radar paths to points other than the line of sight ground intercept indicate these to be of time varying triangular indirect form with systematic length changes. These path lengths, $P_L$, can be closely approximated by the first three terms of a Taylor expansion having the form:

$$P_{L\ real}(t) = (C_0 + C_1 t + C_2 t^2 \ldots)$$

This above equation describes the indirect or real path while the direct path or reference function can be described by a similar equation:

$$P_{L\ reference}(t) = (C_0' + C_1' t + C_2' t^2 \ldots)$$

Using the principle of linear super position it can then be concluded that the difference in path length between the reference function or direct path and the real or indirect path course by the moving object is expressed:

$$P_L \text{difference} = K_0 + K_1 t + K_2 t^2$$

where $K_0 = C_0' - C_0$, $K_1 = C_1' - C_1$, and $K_2 = C_2' - C_2$ since path lengths are proportional to the phase shift a signal undergoes as it traverses the round trip path, the path length differences defined by the above equation are proportional to the difference in phase history of signals returning directly and indirectly via the moving object. Therefore, $K_0$ is proportional to a fixed phase shift, $K_1$ is proportional to a fixed-in-doppler frequency at the mid point of the correlation, and $K_2$ is proportional to a change of doppler slope. When this indirect data is processed in the correlator namely associated with the synthetic aperture radar the disposition of distorted points on the map matrix will be a function of these coefficients. Thus, a signal where phase change has been confined to a constant angle corresponding to $K_0$ will appear shifted in range on the indirect map. Similarly, a point subject to a $K_1$ change will be shifted in azimuth. The processing of the $K_2$ term or doppler slope change will cause the point to appear defocussed, i.e., the energy returning from such a point will be attenuated and will slide over several azimuth cells during the correlation process.

Figure 4:
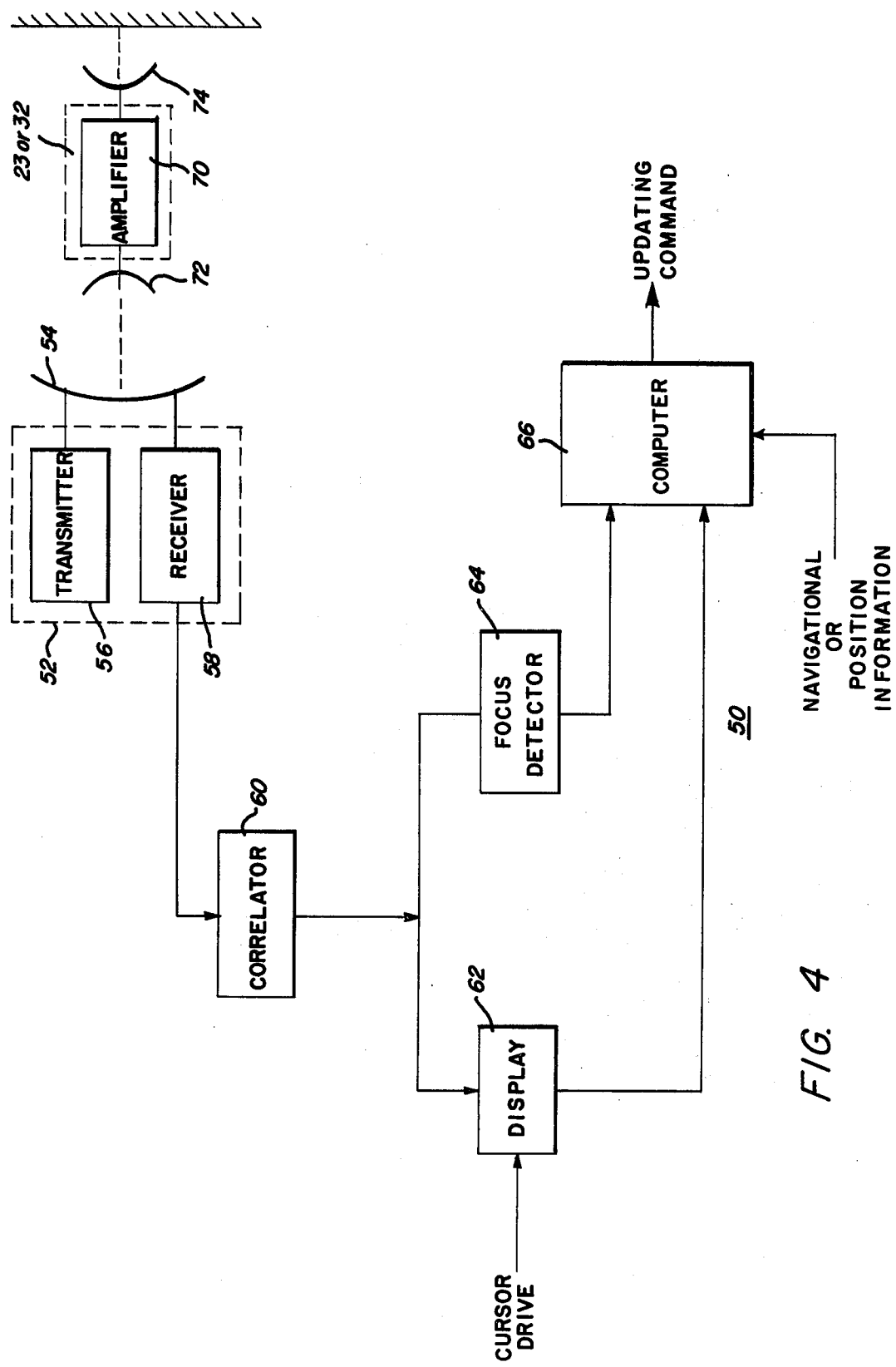
FIG. 4 is a block diagram of the system employed in the present invention.

FIG. 4 shows the implementation of the synthetic aperture retransmission guidance system which is utilized in the radar mapping technique of the present invention. The employment of FIG. 4 may be utilized in the applications shown in FIG. 1-3 as well as others where such mapping technique may be useful. FIG. 4 shows a radar system 50 which includes a synthetic aperture radar shown in the dotted block 52. The synthetic aperture radar 52 includes an antenna 54. Connected to the antenna 54 is a transmitter 56 and a receiver 58. The antenna 54, transmitter 56 and receiver 58 are the basic components of the radar 52. For a more detailed description of a synthetic aperture radar reference should be made to:

C. W. Sherwin, J. P. Ruina and R. D. Rawcliffe, "Some Early Developments in Synthetic Aperture Radar Systems", *IEEE Transactions on Military Electronics*, Vol. MIL-6, No. 2, April 1962, pp. 111-115; and W. M. Brown, "Synthetic Aperture Radar", *IEEE Transactions on Aerospace and Electronics System*, Vol. AES-3, No. 2, March 1967, pp. 217-229.

The receiver 58 of the synthetic aperture radar 52 is connected to a real time correlator 60 to which is applied the direct path or reference function information. A description of a real time correlator may be found in Kaye, M., "SARG Real Time Correlator," Raytheon Technical Memorandum, BL-I-23, Oct. 28, 1976. The output of the optical correlator 60 contains image information which is applied in parallel to a video display 62, such as an oscilloscope. Also applied to the display 62 is cursor drive information which superimposes a linear market on the sweep of the display in order to indicate the desired point on the ground. The output from the correlator 60 is also applied to a focus detector 64 which provides ground impact point prediction, i.e., it predicts the point on the ground towards which the moving object is traveling. The focus detector 64 may be either a flying spot scanner, a micro densitometer or a digital computer. A description of a flying spot scanner may be found in a reference such as, "Optical Processing of Information." Pollock, Koester, Tippett 1963, page 168. A description of an isodensitometer may be found in literature of Technical Operations, Inc. of Burlington, Mass. which manufactures "isodensitometers."

The output from the video display 62 contains information relating to the location of the desired point on the ground to which the moving object is to be directed. The output from the focus detector 64 relates to the location of the point on the ground towards which the moving object is actually traveling at a given instant of time. Both of these outputs from the display 62 and the detector 64 are applied to the system computer 66. Also applied to the computer 66 is navigational information in the case of the applications shown in FIGS. 1 and 3 where the radar system is contained either in an aircraft traveling parallel to the ground or in the moving object itself. In the case of the fixed radar system shown in FIG. 2, positional information is applied to the computer 66. The computer 66 compares the information relating to the location of the desired point on the ground with the location of the point towards which the moving object is traveling. After comparison of this information, the computer 66 provides an updating command to the moving object to change the curvilinear path on which it is traveling in order to direct it towards the desired point on the ground.

In the application shown in FIG. 1 where the moving object itself contains the radar system, no further equipment is necessary to accomplish the desired mapping. In the applications shown in FIGS. 2 and 3, however, where the radar system is not contained in the moving object, it is necessary to provide the moving object 22 in FIG. 2 and 32 in FIG. 3 with means for amplifying the return path signals. Therefore, the moving object 22 in FIG. 2 and 32 in FIG. 3 are each provided with an amplifier 70 as shown in FIG. 4. The amplifier has a pair of antennas 72 and 74 at either end of the amplifier so that the signals may be readily received and transmitted between the radar system 50 and the ground.

With respect to the applications shown in FIGS. 2 and 3, it should be pointed out that the systems will operate even though the fixed radar 20 in FIG. 2 and the radar 30 contained in an airborne vehicle are not within the line of sight with the desired ground points 26 and 36 respectively. For example, there may be a hill or mountain between the radars 20 or 30 which are located at a relatively low altitude. In such a case, there might not be line of sight vision from the radar to the desired ground points. In such a situation, the operation may be referred to as a double-dogleg. In double-dogleg operation, the initial signals transmitted from the radar 20 or 30 to illuminate the ground are sent through the moving object 22 or 32 respectively and relayed to the ground. The return signals from the ground are relayed back to the radar 20 or 30 via the moving objects 22 or 32 respectively. Therefore, both the direct and indirect signals are relayed or retransmitted through the moving objects 22 or 32.

The above description has described the principle of operation and the implementing equipment necessary for the radar mapping technique of the present invention. This technique has a number of applications among which are included the landing of an airborne vehicle, the delivery of some desired object or materials to a given point on the ground and other applications where it may be desirable to obtain a map of a specified area of the ground.

It should be understood, of course, that the foregoing disclosure relates to only preferred embodiments of the invention and that numerous modifications or alterations may be made therein without departing from the spirit and the scope of the invention as set forth in the appended claims.

We claim:

1. A mapping system for mapping points on the ground towards which an object may be traveling, said system comprising:
   means for transmitting a beam so as to illuminate a portion of the ground;
   means for receiving return signals from the illuminated portion of the ground;
   means for correlating the return signals;
   means for displaying the correlated signals and for indicating the location of a predetermined point on the ground;
   focus detection means connected to the output of the correlation means for indicating the location of the point on the ground towards which the object is actually traveling; and
   means connected to the output of the display means and the focus detection means for comparing the signal outputs and for maintaining the predetermined point on the ground in the area of best focus.

2. A radar mapping system for use in directing an object traveling in a rotating frame of reference in mid air towards a desired point on the ground, said system comprising:
   radar means including a transmitter for transmitting a beam so as to illuminate a portion of the ground and a receiver for receiving return signals from the illuminated portion of the ground;
   correlation means for correlating the return signals so as to produce image mapping information;
   display means for displaying the image mapping information from the correlation means and for indicating the location of the desired point on the ground;
   focus detection means for detecting the image mapping information from the correlation means so as to indicate the location of the point on the ground towards which the object is actually traveling; and
   means connected to the output of said display means and said focus detection means for comparing the locations of the desired ground point and the point towards which the object is actually traveling so as to maintain the desired point in the area of best focus of the radar map.

3. A radar mapping system for use in directing an object traveling in a rotating frame of reference in mid air towards a desired point on the ground, said system comprising:
   radar means including a transmitter for transmitting a beam so as to illuminate a portion of the ground and a receiver for receiving return signals from the illuminated portion of the ground;
   a real time correlator for correlating the return signals so as to produce image mapping information;
   a video display for displaying the image mapping information from the correlator, said display including cursor drive means for permitting indication of the desired point on the ground;
   focus detection means for detecting the image mapping information from the correlator so as to predict the location of the impact point on the ground towards which the object is actually traveling; and
   computing means connected to the output of the display and said focus detection means for comparing the difference between the locations of the desired point and the impact prediction point so as to maintain the desired point in the area of best focus of the radar map.

4. A radar mapping system for use in directing an airborne object traveling in a curvilinear path towards a desired point on the ground, said system comprising:
   a synthetic aperture radar including a transmitter for transmitting a beam so as to illuminate a portion of the ground and a receiver for receiving return signals from the illuminated portion of the ground;
   a real time correlator for corrolation of the return signals so as to produce image mapping information;
   a video display for displaying the image mapping information from the correlator, said display including cursor drive means for permitting indication of the desired point on the ground;
   focus detection means for detecting the image mapping information from the correlator so as to predict the location of the impact point on the ground towards which the object is actually traveling; and
   computing means connected to the output of the display and said focus detection means for comparing the differences between the locations of the desired point and the impact prediction point so as to maintain the desired point in the area of best focus of the radar map.

5. A radar mapping system as set forth in claim 4 wherein said focus detection means is a flying spot scanner.

6. A radar mapping system as set forth in claim 4 wherein said focus detection means is an isodensitometer.

7. A radar mapping system for use in directing an object traveling in a rotating frame of reference in mid air towards a desired point on the ground, said system comprising:
   radar means including a transmitter for transmitting a beam so as to illuminate a portion of the ground and a receivier for receiving return signals from the illuminated portion of the ground, said radar means contained in the traveling object;
   correlation means for correlating the return signals so as to produce image mapping information;
   display means for displaying the image mapping information from the correlation means and for indicating the location of the desired point on the ground;
   focus detection means for detecting the image mapping information from the correlation means so as to indicate the location of the point on the ground towards which the object is actually traveling; and
   means connected to the output of said display means and said focus detection means for comparing the locations of the desired ground point and the point towards which the object is actually traveling so as to maintain the desired point in the area of best focus of the radar map.

8. A radar mapping system for use in directing an airborne object traveling in a curvilinear path towards a desired point on the ground, said system comprising:
   radar means including a transmitter for transmitting a beam so as to illuminate a portion of the ground and a receiver for receiving return signals from the illuminated portion of the ground; said radar means located in a fixed position from which said radar means is capable of illuminating the area on the ground in which the desired point is located, said receiver being capable of receiving both direct and indirect return signals;

amplifying means located in said traveling object, said amplifying means being provided to relay the indirect return signals from the ground to the receiver of said radar means without altering the phase of said signals;

correlation means for correlating the direct and indirect return signals so as to produce image mapping information;

display means for displaying the image mapping information from the correlation means and for indicating the location of the desired point on the ground;

focus detection means for detecting the image mapping information from the correlation means so as to indicate the location of the point on the ground towards which the object is actually traveling; and means connected to the output of said display means and said focus detection means for comparing the locations of the desired ground point and the point towards which the object is actually traveling so as to maintain the desired point in the area of best focus of the radar map.

9. A radar mapping system for use in directing an airborne object traveling in a curvilinear path towards a desired point on the ground, said system comprising:

radar means including a transmitter for transmitting a beam so as to illuminate a portion of the ground and a receiver for receiving return signals from the illuminated portion of the ground, said radar means located in an aircraft which is traveling in a direction parallel to the ground, said receiver being capable of receiving both direct and indirect return signals;

amplifying means located in said traveling object, said amplifying means being provided to relay the indirect return signals from the ground to the receiver of said radar means without altering the phase of said signals;

correlation means for correlating the direct and indirect return signals so as to produce image mapping information;

display means for displaying the image mapping information from the correlation means and for indicating the location of the desired point on the ground;

focus detection means for detecting the image mapping information from the correlation means so as to indicate the location of the point on the ground towards which the object is actually traveling; and means connected to the output of said display means and said focus detection means for comparing the locations of the desired ground point and the point towards which the object is actually traveling so as to maintain the desired point in the area of best focus of the radar map.

10. A radar mapping system for use in directing an airborne object traveling in a curvilinear path towards a desired point on the ground, said system comprising:

synthetic aperture radar means including a transmitter for transmitting a beam so as to illuminate a portion of the ground and a receiver for receiving return signals from the illuminated portion of the ground, said radar means contained in the traveling object;

a real time correlator for correlating the return signals so as to produce image mapping information;

a video display for displaying the image mapping information from the correlator, said display including cursor drive means for permitting indication of the desired point on the ground;

focus detection means for detecting the image mapping information from the correlator so as to predict the location of the impact point on the ground towards which the object is actually traveling; and a digital computer connected to the output of the display and said focus detection means for comparing the difference between the locations of the desired point and the impact prediction point so as to maintain the desired point in the area of best focus of the radar map.

11. A radar mapping system for use in directing an airborne object traveling in a curvilinear path towards a desired point on the ground, said system comprising:

synthetic aperture radar means including a transmitter for transmitting a beam so as to illuminate a portion of the ground and a receiver for receiving return signals from the illuminated portion of the ground; said radar means located in a fixed position from which said radar means is capable of illuminating the area on the ground in which the desired point is located, said receiver being capable of receiving both direct and indirect return signals;

a retransmission amplifier located in the traveling object, said amplifier being provided to relay the indirect return signals from the ground to the receiver of said radar without altering the phase of said signals;

a real time correltor for correlating the return signals so as to produce image mapping information;

a video display for displaying the image mapping information from the correlator, said display including cursor drive means for permitting indication of the desired point on the ground;

focus detection means for detecting the image mapping information from the correlator so as to predict the location of the impact point on the ground towards which the object is actually traveling; and a digital computer connected to the output of the display and said focus detection means for comparing the difference between the locations of the desired point and the impact prediction point so as to maintain the desired point in the area of best focus of the radar map.

12. A radar mapping system for use in directing an airborne object traveling in a curvilinear path towards a desired point on the ground, said system comprising:

synthetic aperture radar means including a transmitter for transmitting a beam so as to illuminate a portion of the ground and a receiver for receiving return signals from the illuminated portion of the ground, said radar means located in an aircraft which is traveling in a direction parallel to the ground, said receiver being capable of receiving both direct and indirect return signals;

a retransmission amplifier located in the traveling object, said amplifier being provided to relay the indirect return signals from the ground to the receiver of said radar without altering the phase of said signals;

a real time correlator for correlating the return signals so as to produce image mapping information;

a video display for displaying the image mapping information from the correlator, said display including cursor drive means for permitting indication of the desired point on the ground;

focus detection means for detecting the image mapping information from the correlator so as to predict the location of the impact point on the ground towards which the object is actually traveling; and a digital computer connected to the output of the display and said focus detection means for comparing the difference between the locations of the desired point and the impact prediction point so as to maintain the desired point in the area of best focus of the radar map.

13. A mapping technique for directing an object traveling in a rotating frame of reference in mid air towards a desired point on the ground, said technique comprising the steps of:

transmitting a beam so as to illuminate an area of the ground in which the desired point is located;

receiving return echo signals from the illuminated area of the ground;

correlating the return signals so as to produce image mapping information;

displaying the correlated image mapping information so as to indicate the location of the desired point on the ground;

detecting the area of best focus of the image mapping information so as to indicate the location of the point on the ground towards which the object is actually traveling;

comparing the difference in locations of the desired point and the point towards which the object is actually travelling so as to maintain the desired point in the area of best focus; and transmitting updating command information to the object so as to maintain its direction towards the desired point on the ground.

14. A radar mapping technique for directing an object traveling in a curvilinear path in mid air towards a desired point on the ground, said technique comprising the steps of:

transmitting a beam from a synthetic aperture radar so as to illuminate an area of the ground in which the desired point is located;

receiving both direct return echo signals from the illuminated area of the ground and indirect return echo signals unchanged in phase via the traveling object;

correlating the direct and indirect return signals so as to produce image mapping information;

displaying the correlated image mapping information so as to indicate the location of the desired point on the ground;

detecting the area of best focus of the image mapping information so as to indicate the location of the point on the ground towards which the object is actually traveling;

comparing the difference in locations of the desired point and the point towards which the object is actually traveling so as to maintain the desired point in the area of best focus; and transmitting updating command information to the object so as to maintain its direction towards the desired point on the ground.

* * * * *